Jan. 6, 1953 S. A. PIERCE 2,624,059
NUT CLEANING AND POLISHING MACHINE
Filed Oct. 18, 1946 5 Sheets-Sheet 3
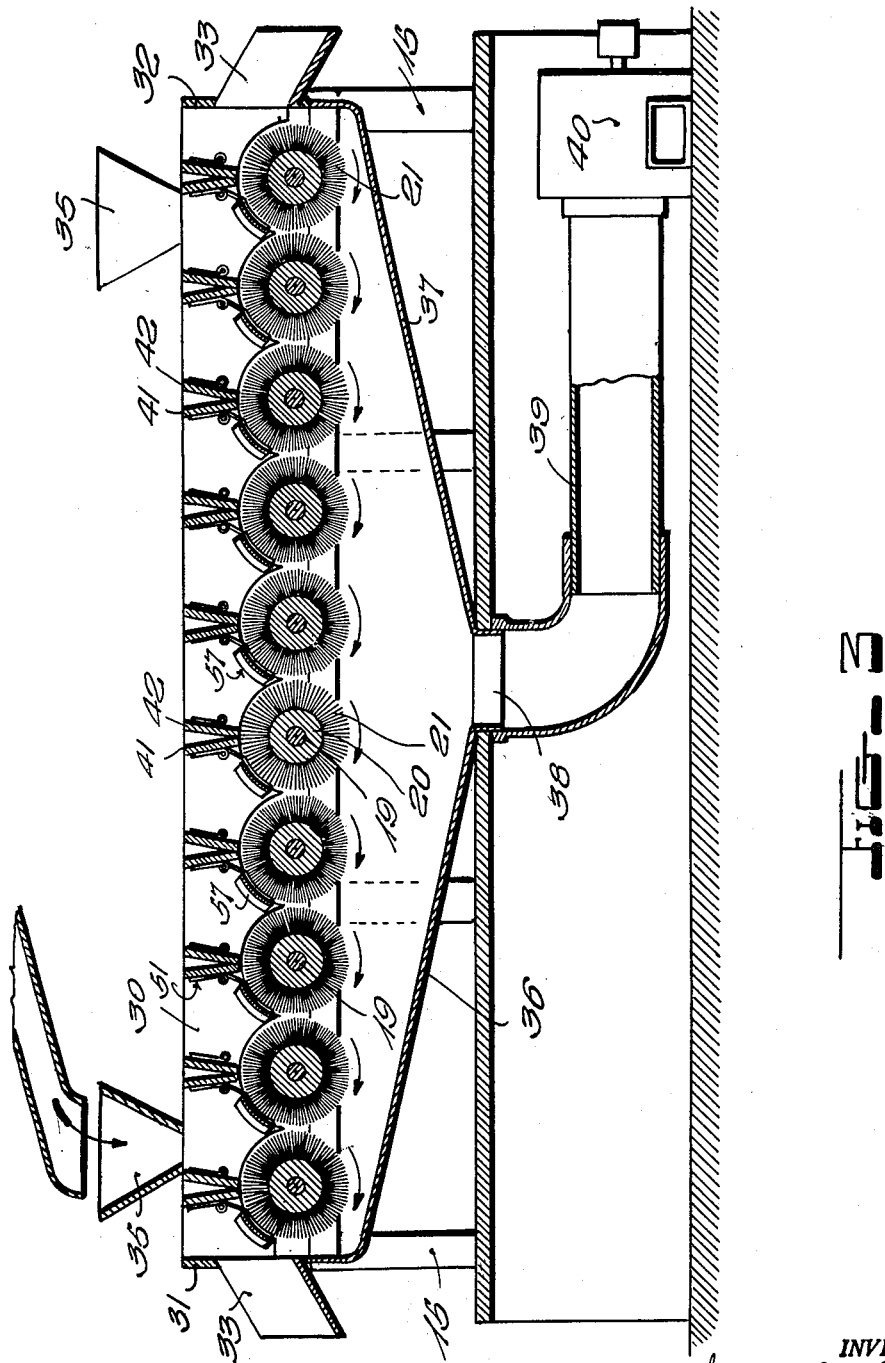
INVENTOR,
Sam A. Pierce,
BY Frank S. Appleman,
attorney.

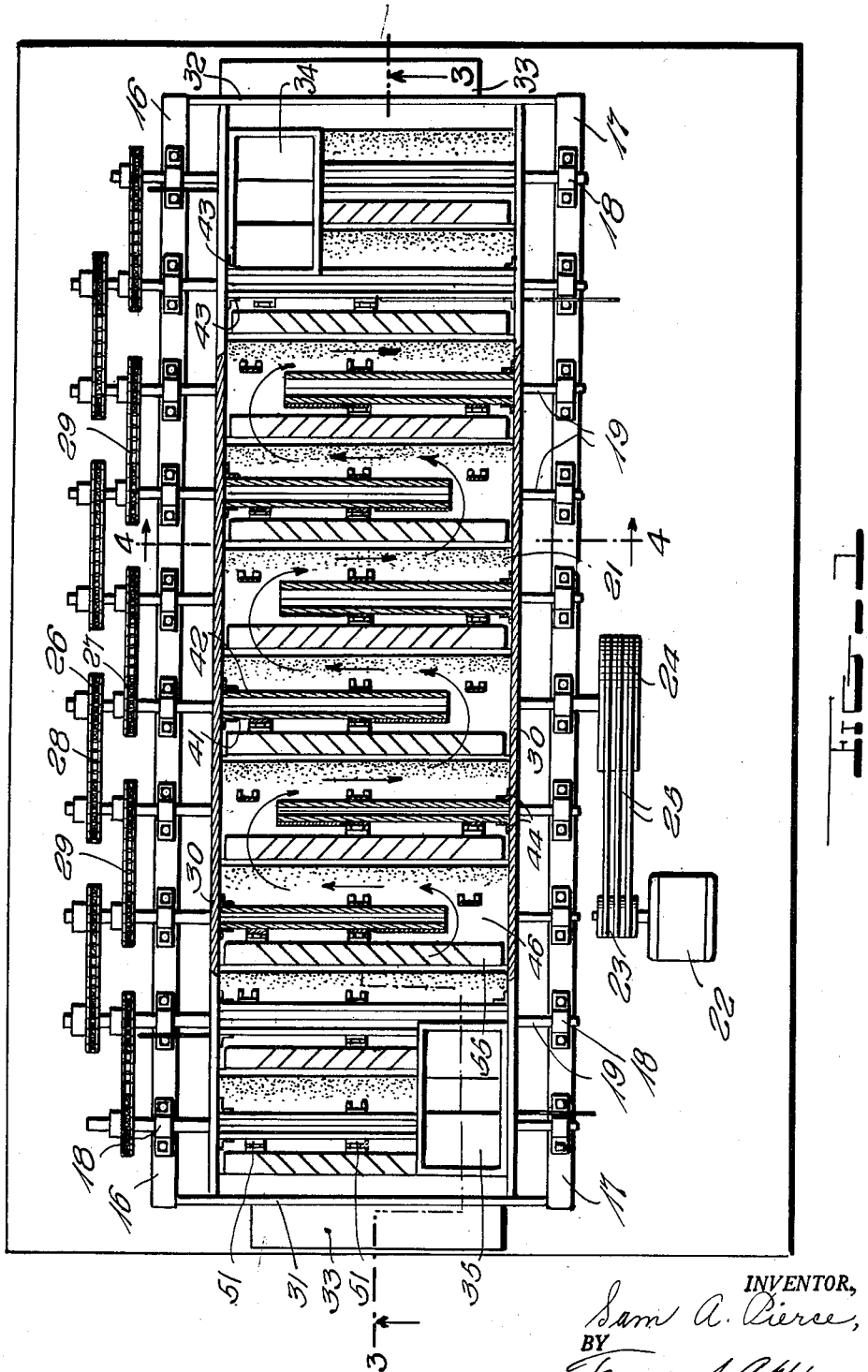

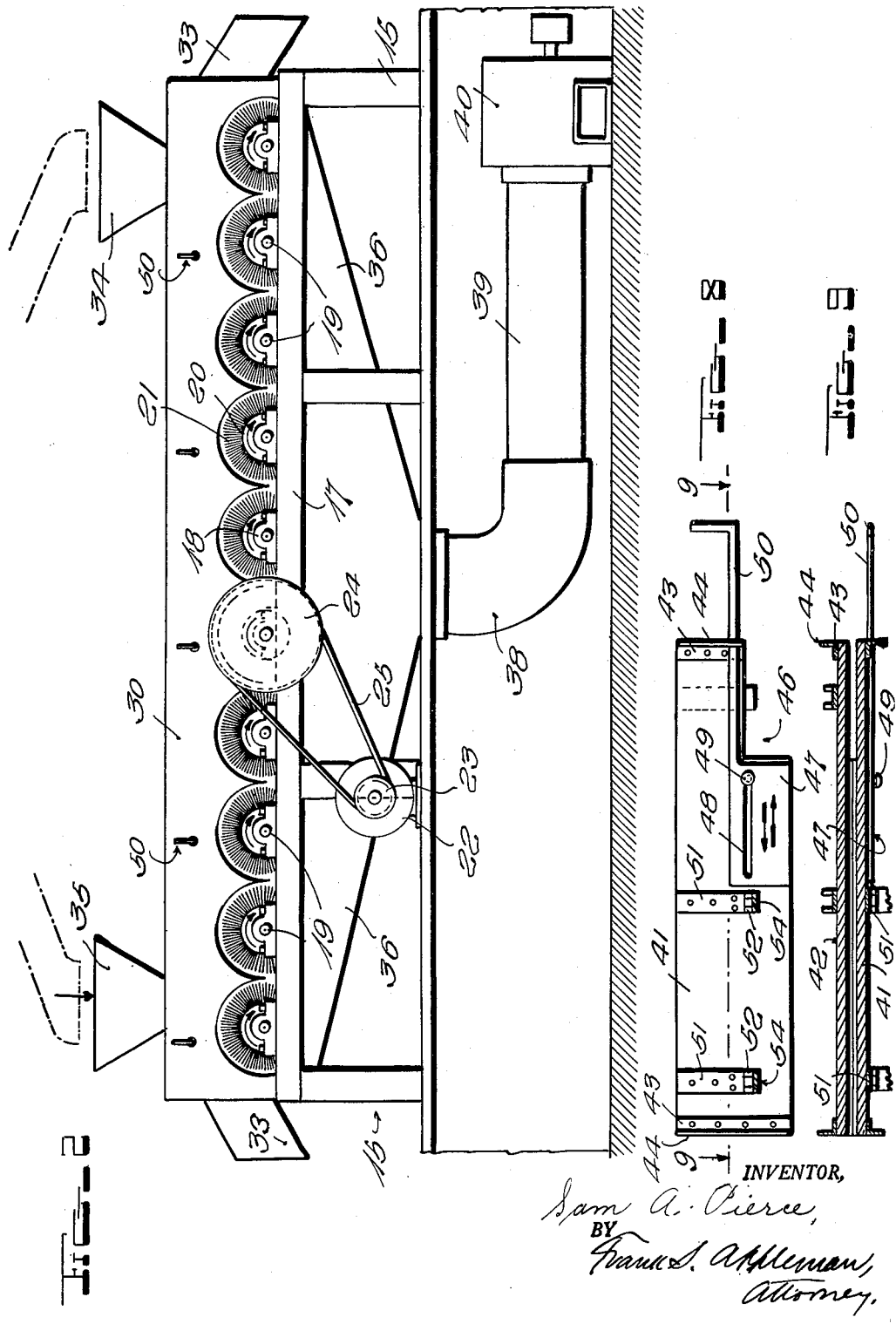

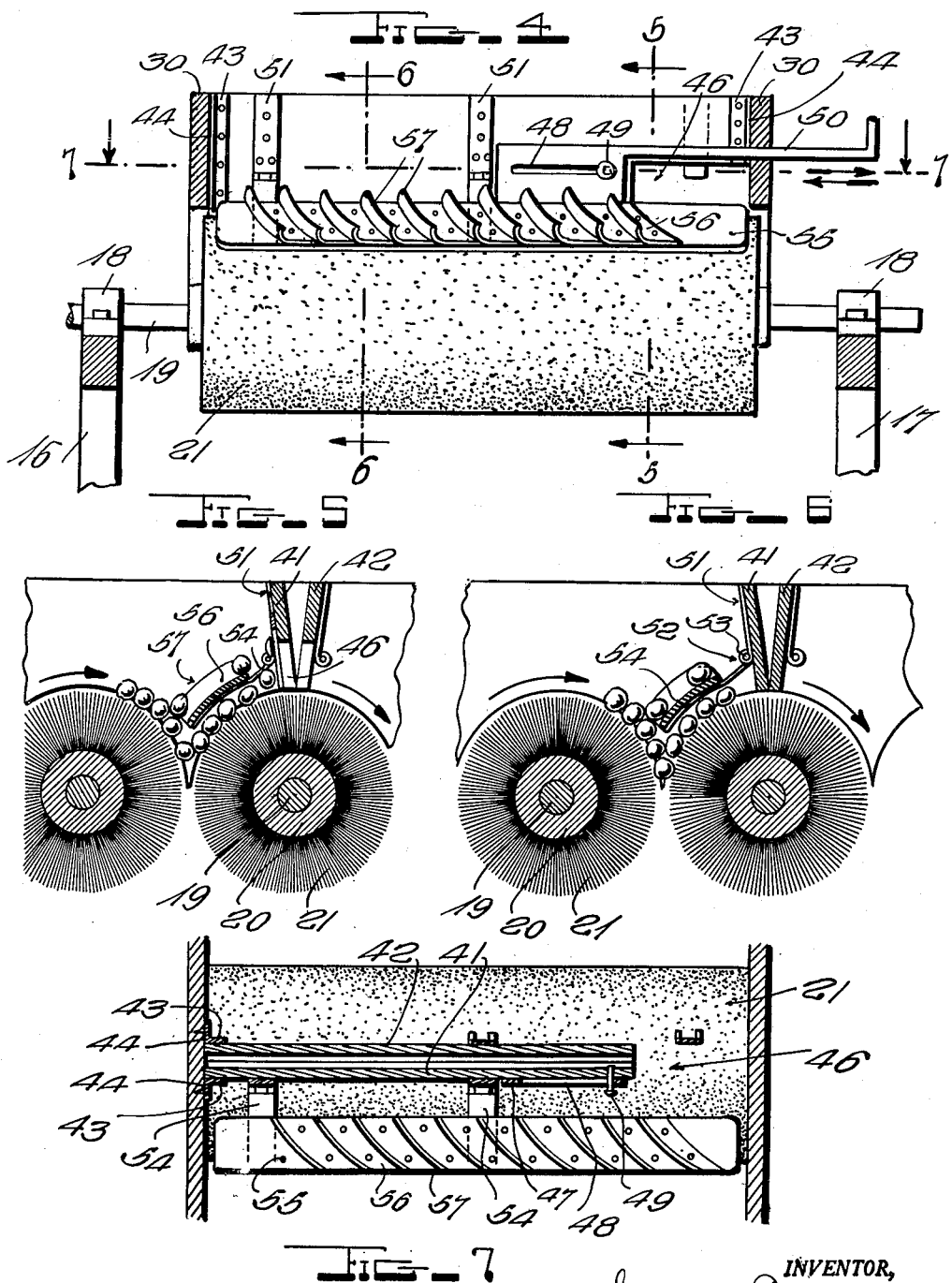

Jan. 6, 1953 S. A. PIERCE 2,624,059
NUT CLEANING AND POLISHING MACHINE
Filed Oct. 18, 1946 5 Sheets-Sheet 5

INVENTOR,
Sam A. Pierce,
BY Frank S. Appleman,
Attorney.

UNITED STATES PATENT OFFICE 2,624,059

NUT CLEANING AND POLISHING MACHINE

Sam A. Pierce, Cairo, Ga.

Application October 18, 1946, Serial No. 704,228

2 Claims. (Cl. 15—3.17)

This invention relates to nut cleaning and polishing instrumentalities, and particularly to a device for removing deposits from nuts, which deposits are left thereon after the nut is hulled. In practice, the machine may be employed in cleaning a variety of nuts, but it has been found particularly efficient and satisfactory in treating pecans.

An object of this invention is to produce a machine having a plurality of rotatably mounted scouring brushes, and it has been found that rotary wire brushes are efficient and satisfactory for the purpose.

A further object of the invention is to produce a plurality of pairs of rotatably mounted brushes suitably encased, in which means are provided for causing the nuts to traverse the case transversely thereof, providing means by which the nuts may escape at one side of the case and then travel in the opposite direction in contact with other coacting brushes and to thus continue the direction of travel of the nuts laterally of the case until an exit opening is reached, from which the nuts are collected for bagging or the like.

It is a further object of the invention to provide a plurality of division or partition plates arranged over each of the brushes in line with the axis of the brush; and it is furthermore an object of the invention to provide partitions, preferably in pairs, that diverge slightly from their lower edges to their upper edges, and the ends of each pair of partitions are cut away at alternate ends for clearance through which nuts escape at the side of the case, this being for the purpose of permitting the nuts to escape from a space on one side of the partition to a space on the opposite side thereof where they will be subjected to the action of the succeeding coacting brushes, and it is understood that while the nuts are being conveyed laterally of the case, they are also being moved longitudinally thereof, step by step, so that they will in time be discharged at an end of the apparatus, and it is obvious that the nuts will travel transversely of the case in contact with the brushes; and it is furthermore the purpose to change the direction of rotation of the brushes when such change becomes expedient, for it has been found that the brush wires become worn or slightly bent at their ends and it is desirable to rotate them oppositely so that the wear on the brushes will be evenly distributed, and such bent wires will be straightened and then bent in opposite directions.

It is a still further object of the invention to provide floating guides which will serve to direct the nuts laterally of the case and longitudinally of the brushes and they will travel toward the end of the partition where the opening is available for the escape of the nuts, such floating guides by their weight also serve to forcibly engage nuts with the brushes which nuts have a tendency to be pushed away from the brushes upon slightest contact. The floating guides have novel means of attachment to the partitions whereby their relation to the partitions may be changed and their guiding action reversed, as will presently appear.

It is furthermore an object of this invention to provide a suitable base or frame having bearings for shafts of the cylindrical brushes, and furthermore, to provide gearing in the nature of sprocket chains and sprocket wheels for driving or rotating the brushes; and it is furthermore the purpose of the inventor to operate the gearing through the employment of a motor coupled to one of the shafts and through the driven shaft to drive all of the rotary brushes. And, in practice, after the rotary brushes have been operated for a given time, for instance, a clockwise direction, and until wear on the brushes is apparent, the direction of drive of the motor is changed so that the rotary brushes will be driven in the opposite or anticlockwise direction.

A further object of the invention is to provide a case having exit openings in both ends so that when the brushes are operated in the two directions alternately, provision is made for removing the cleaned nuts at either end, and likewise, provision is made for delivering nuts to be cleaned at either end of the case.

A still further object of the invention is to provide a dust exhausting instrumentality stationed under the frame, in which dust or dirt is deposited and from whence it is removed by an exhaust fan.

A further object of the invention is to provide a modified means which operates to move the nuts longitudinally of the case which, as will appear, comprises alternately left-hand and right-hand screw conveyors suitably operated in locations between the coacting cylindrical brushes.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which:

Figure 1 illustrates a plan view of the machine with the nut feeding hopper and chutes removed, and with partitions and other parts in section;

Figure 2 illustrates a view in side elevation of the machine showing in dotted lines the chutes for delivering nuts to the machine;

Figure 3 illustrates a sectional view of the machine on the line 3—3 of Fig. 1;

Figure 4 illustrates a sectional view of the machine on the line 4—4 of Fig. 1;

Figure 5 illustrates a sectional view of the machine on the line 5—5 of Fig. 4;

Figure 6 illustrates a sectional view of part of the machine on the line 6—6 of Fig. 4;

Figure 7 illustrates a sectional view of a fragment of the machine on the line 7—7 of Fig. 4;

Figure 8 illustrates a detail view in elevation of one of the partitions showing the controlling gate for regulating the exit space at the end of a partition;

Figure 9 illustrates a sectional view on the line 9—9 of Fig. 8;

Figure 10:
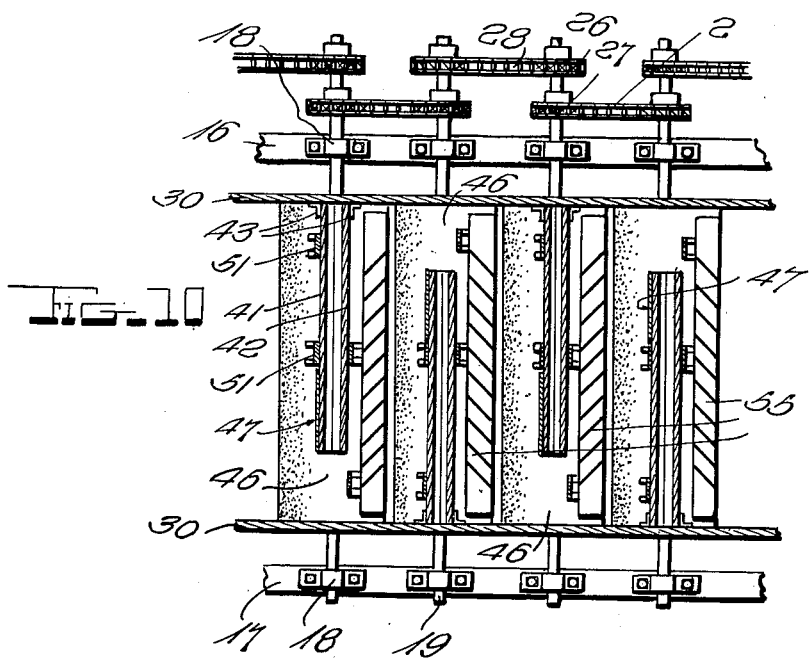
Figure 10 illustrates a fragmentary plan view showing the partitions reversed and the floating guides in reversed position.

The frame 15 may be of any type which will support the operating mechanism, but it includes side rails 16 and 17 on each of which a plurality of journal bearings, such as 18, are secured, and the said journal bearings have shafts, such as 19, rotatably mounted in them and each shaft extends through a core 20 of a brush 21. Preferably, the brushes are of the wire type, although the inventor does not wish to be limited with respect to this as it is conceivable that plastic elements or bristles might be developed which would have sufficient scouring action to clean nuts subject to them. A motor 22, which is preferably of the electric type and reversible, is employed for driving a train of gearing through the employment of a pulley 23 on the commutator shaft of the motor, a pulley 24 on an extension of one of the shafts 19, and appropriate belts 25, preferably of the V-type, but as to the details, they could be modified to suit particular requirements as those skilled in the art will visualize. The driven shaft 19 at the opposite end from the pulley 24 is employed to drive a plurality of shafts through means of sprocket wheels 26 and 27 having engaging sprocket chains 28 and 29, respectively, which, in turn, drive shafts of the other rotary brushes. The case has side members, such as 30, and ends 31 and 32, each of which has an aperture with a discharge spout, such as 33, through which the nuts are discharged for bagging or other distribution. The discharge openings in the ends 31 and 32 are on opposite sides of the case so that when the brushes are rotated in a clockwise direction, the nuts will be discharged through the spout 33 at the right-hand end of the machine as viewed in Figs. 1 and 2, whereas when the machine is operated with the brushes rotating anti-clockwise, the nuts will be discharged through the spout 33 at the left-hand end of the machine as viewed in Figs. 1 and 2.

Provision is made for delivering nuts selectively at either end of the case and the delivery should be over the space between the last two of the rotary brushes at the ends. To accomplish this delivery of the nuts, tubes or spouts 34 and 35 lead from a hopper (not shown), and the nuts are selectively delivered at either end by closing one or the other of the spouts, according to the desired delivery of the nuts.

It is obvious that instead of a case with sides and ends being employed, the ends of the brushes may have elements like the side members of the case projecting upwardly from the base to limit the movement of the nuts with relation to the axes of the brushes and, under certain conditions, the ends of the case may be omitted so that the nuts when they reach the end of the frame will escape for such treatment as may be accorded them.

A dust collecting pan 36 is suspended under the rotary brushes in any appropriate manner, and it has a bottom 37 which is inclined from the end edges toward an intermediate portion thereof, which bottom has a discharge opening 38 to which a spout or tube 39 is connected, leading to an appropriately operated exhaust fan 40 and, through these associated elements, dust or dirt dislodged from the nuts is disposed of in a manner which prevents circulation of said dust in the air around the machine.

Substantially in line with the axis of each rotary brush, partitions are assembled thereabove, and, in the present embodiment of the invention, each partition comprises two strips of material 41 and 42 which are preferably of wood. At each end of the partition, each of the strips forming the partition has an angle iron 43 attached to it, and the flange 44 of each angle iron is secured on the inner surface of one of the sides 30. It is seen that each partition is cut away at one end to form a clearance 46 for the escape of nuts, and each partition has a gate or shutter 47 provided with a slot 48 through which a stud 49 projects, and the stud is anchored on the partition so that the gate may slide longitudinally of the partition to restrict the passage through the opening 46 at the lower edge at one end of the partition. The gate is operated by a rod 50 slidable through the side of the case and thus the flow of nuts through the several spaces between the brushes may be controlled.

Hinges are provided on the partition strips and they each preferably comprise a leaf 51 having an eye 52 to receive a pintle 53 which are removable so that another hinge member 54 may be adjusted on it. Each of the hinge members 54 on one side of a partition member is connected to a floating guide 55 which rises and falls with respect to a rotary brush with which it is associated and in proportion to amount of nuts which may be crowded under it, and in order that the nuts will be directed transversely of the case, the floating guides are provided with plates, such as 56, having curved flanges 57 which help direct the nuts laterally of the case. Figures 5 and 6 show how the brushes act on the nuts, it being understood that the brushes are so close together that the nuts cannot go between them, and that as they accumulate between the brushes, they are elevated above the upper edge of the guide and then gravitate or descend on the guide through the several channels afforded by the flanges, so that as they escape from the guide they are closer to one side of the case than they were when they entered the guide, and as they progress in this manner laterally of the case, they reach an exit opening and pass to the space between the next coacting brushes where they are moved toward the opposite side of the case by the guide whose flanges are oppositely disposed with relation to those of the preceding pair of brushes.

As has been stated, when the brushes are driven in an anti-clockwise direction, it becomes necessary to change the floating guides so that they will guide the nuts in a direction opposite that in which they functioned in their first installation, and, to accomplish this, the pintles of the hinges are removed and the floating guides are reversed as to position and the pintles replaced when thus assembled, this change of positions of the floating guides being illustrated in Figure 10.

Figure 11:
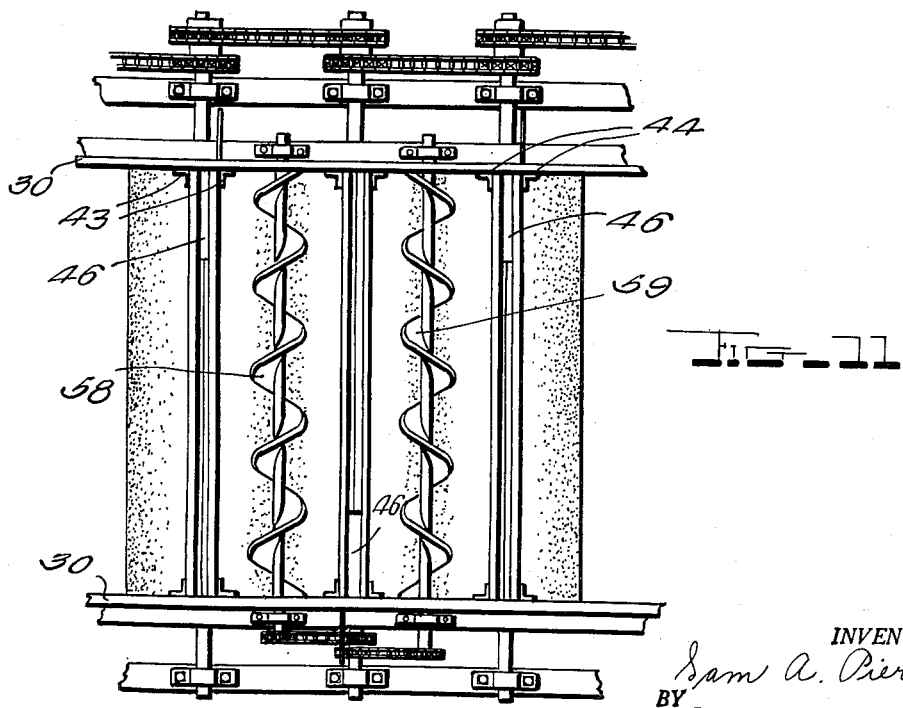
Figure 11 illustrates a fragmentary plan view of a modified means for moving the nuts transversely of the case.

In the modified construction shown in Figure 11, the mechanism heretofore described is installed, except as to the means for moving the nuts transversely of the case, and, in the modified form, screw conveyors, such as 58 and 59, are employed on opposite sides of the partitions, it being shown that the shafts of the conveyors are geared to one of the shafts of the brushes, however, other means of power may be used. Since the installation is obvious from an inspection of Figure 11, it is believed unnecessary to describe the assembly in detail.

I claim:

1. In a nut cleaning and polishing machine, a base, a case on said base having sides and ends, a discharge spout communicating with the case, a plurality of driven brushes journalled in the base in positions whereby the peripheries of the succeeding brushes are in proximity to one another, partitions supported above each of the brushes, the said partitions having openings at alternate ends for the escape of nuts longitudinally of the case, means for guiding the nuts in opposite directions at the sides of the partitions, said means comprising guiding members hingedly suspended from a partition and having a plurality of plates having diagonally disposed flanges, and means for delivering nuts to the brushes.

2. In a nut cleaning and polishing machine, a base, a case on said base having sides and ends, a discharge spout communicating with the case, a plurality of driven brushes journalled in the base in positions whereby the peripheries of the succeeding brushes are in proximity to one another, partitions supported above each brush, the said partitions alternately having openings at opposite ends for the escape of nuts at the sides of the case, means for guiding the nuts in opposite directions at the sides of the partitions, said means comprising guiding members hingedly suspended from a partition and having a plurality of diagonally disposed guides, means for delivering nuts to the brushes, and means for mounting the guiding members in reversed positions on the said partitions whereby the nuts are guided in an opposite transverse direction selectively.

SAM A. PIERCE.

REFERENCES CITED

The following references are of record in the file of this patent:

UNITED STATES PATENTS

| Number | Name | Date |
| --- | --- | --- |
| 872,468 | Smith | Dec. 3, 1907 |
| 1,205,118 | Stebler | Nov. 14, 1916 |
| 1,296,131 | Stebler | Mar. 4, 1919 |
| 2,292,143 | Meagher | Aug. 4, 1942 |